US006033619A

United States Patent [19]

Hattori

[11] Patent Number: 6,033,619

[45] Date of Patent: Mar. 7, 2000

[54] METHOD FOR MANUFACTURING CERAMICS HAVING FINE HOLES

[75] Inventor: Mitsuru Hattori, Ama-gun, Japan

[73] Assignee: NGK Insulators, Ltd., Nagoya, Japan

[21] Appl. No.: 07/984,448

[22] Filed: Dec. 2, 1992

[30] Foreign Application Priority Data

Dec. 2, 1991 [JP] Japan .................................... 3-318023

[51] Int. Cl.[7] ...................................................... C04B 35/64

[52] U.S. Cl. .......................... 264/629; 264/632; 264/642; 264/645; 264/678

[58] Field of Search ................................ 264/60, 67, 629, 264/632, 642, 645, 678

[56] References Cited

U.S. PATENT DOCUMENTS

| | | | |
|---|---|---|---|
| 3,725,186 | 4/1973 | Lynch | 264/60 |
| 4,248,813 | 2/1981 | Hattorti et al. | 264/60 |
| 4,662,958 | 5/1987 | Conder et al. | 264/56 |
| 4,722,762 | 2/1988 | Luhleich | 264/261 |
| 4,853,053 | 8/1989 | Minjolle et al. | 156/73.5 |
| 5,106,550 | 4/1992 | Yogo et al. | 264/63 |

FOREIGN PATENT DOCUMENTS

| | | |
|---|---|---|
| 0 142 852 A2 | 5/1985 | European Pat. Off. . |
| 0 265 777 A2 | 5/1988 | European Pat. Off. . |
| 0 462 473 A2 | 12/1991 | European Pat. Off. . |

OTHER PUBLICATIONS

Patent Abstracts of Japan, vol. 16, No. 161 (M1237) Apr. 20, 1992 & JP–A–40 10 905 (Nippon Steel Corp. Jan. 16, 1992 *abstract*.

Patent Abstracts of Japan, vol. 13, No. 221 (c–598) May 23, 1989 & JP–A–10 33 080 (NGK Insulators Ltd) Feb. 2, 1989 *abstract*.

Database WPIL Week 8509, Derwent Publications Ltd., London, GB; AN 85–053748 & JP–A–60 011 276 (NGK Spark Plug KK) Jan. 21, 1985 *abstract*.

*Primary Examiner*—James Derrington
*Attorney, Agent, or Firm*—Kubovcik & Kubovcik

[57] ABSTRACT

A method for manufacturing ceramics with fine hole(s) includes the steps of: forming independently ceramic compacts, said ceramic compacts having their shapes corresponding to the divided parts of one integrated body having at least one fine hole along which the integrated body is divided; joining said compacts into an integrated form by cold isostatic pressing (CIP); and firing the integrated compact. Another method for manufacturing ceramics with fine hole(s) includes the steps of: forming independently ceramic compacts; grooving said compacts to make at least one desired partial hole in given places of each cross section by machining; joining said compacts into an integrated form by cold isostatic pressing (CIP); and firing the integrated compact. According to these methods, there can be obtained a sintered ceramic body with holes, each having a very small diameter and an unrestricted depth, or holes in a complex or curved shape.

4 Claims, 7 Drawing Sheets

METHOD FOR MANUFACTURING CERAMICS HAVING FINE HOLES

BACKGROUND OF THE INVENTION AND RELATED ART STATEMENT

The present invention relates to a method for manufacturing ceramics with fine hole(s). More specifically, the present invention relates to a method for manufacturing ceramics with fine hole(s) arranged in given place(s) without machining after firing.

Ceramic materials such as silicone nitride, silicone carbide, and partially stabilized zirconia possess excellent properties of heat resistance, abrasion resistance, hardness, corrosion resistance, and the like. Therefore, they are used for machine parts. The field in which ceramic materials are used has been expanding by successive improvements, rationalization of designs, and so on.

Concerning such ceramic parts, there is a demand of forming hole(s) with a given diameter in given place(s). For example, ceramic blades (turbine blades and tubine nozzle) used in a gas turbine have adequate cooling hole(s) for cooling the component and assuring higher reliabilities.

When such a ceramic part having hole(s) is manufactured, the method shown in the process flow chart in FIG. 6 has conventionally been adopted, which comprises the steps of: pressing ceramic powders to give a compact; removing the binder included in the compact by heating; subjecting the compact to cold isostatic pressing (CIP); and making hole(s) by dry machining followed by firing, or firing followed by making holes. In order to make holes, a twist drill, an ultrasonic wave, laser, or the like, has usually been used.

However, such conventional means of making a fine hole with a twist drill, an ultrasonic wave, laser, or the like cannot provide a hole with a diameter equal to or smaller than 0.5 mm, and the depth of the hole is limited to about 10 times as long as the diameter of the hole. Moreover, such means has a problem that a hole in a curved or complex shape cannot be provided.

The present invention aims to provide a method for manufacturing ceramics with fine hole(s) having a diameter equal to or smaller than 0.5 mm and capable of achieving a desired depth and shape of hole(s).

SUMMARY OF THE INVENTION

According to the present invention, there is provided a method for manufacturing ceramics with fine hole(s) comprising the steps of: forming independently ceramic compacts having their shapes corresponding to the divided parts of one integrated body having at least one fine hole along which the integrated body is divided into at least two; joining said compacts into an integrated form by cold isostatic pressing (CIP); and firing the integrated compact.

According to the present invention, there is also provided a method for manufacturing ceramics with fine hole(s) comprising the steps of: forming ceramic compacts without partial holes independently; grooving the compacts to make desired partial hole(s) at given place(s) of each cross section by machining; joining said compacts into an integrated form by cold isostatic pressing (CIP); and firing the integrated compact.

DETAILED DESCRIPTION OF PREFERRED EMBODIMENTS

In the present invention, holes are not made after removing the binder or after firing. First, ceramic compacts are formed so as to have a shape corresponding to the divided part of one integrated body having at least one fine hole along which the integrated body is divided into at least two compacts, or machining is performed to make desired partial hole(s) in given place(s) of each cross section of the ceramic compacts without partial hole(s). Then, the ceramic compacts are joined into an integrated form by cold isostatic pressing (CIP). Since the ceramics with fine hole(s) in the present invention are thus obtained, there can be provided ceramics with hole(s) having a diameter equal to or smaller than 0.5 mm and capable of having any desired depth and shape. Moreover, it is possible to provide ceramics with complex or curved hole(s).

In the present invention, the means to form each ceramic compact is not particularly limited. Though press molding, injection molding, or slip casting can be employed, press molding and injection molding are preferable among them. When injection molding or slip casting is employed to form one of the ceramic compacts while press molding is employed to form the other ceramic compacts (when the compacts are only two), the compact obtained by injection molding or slip molding is necessarily subjected to cold isostatic pressing (CIP) so that the contraction rate of the compact molded by injection molding or slip molding corresponds to that of the other compact molded by press molding.

Figure 1:
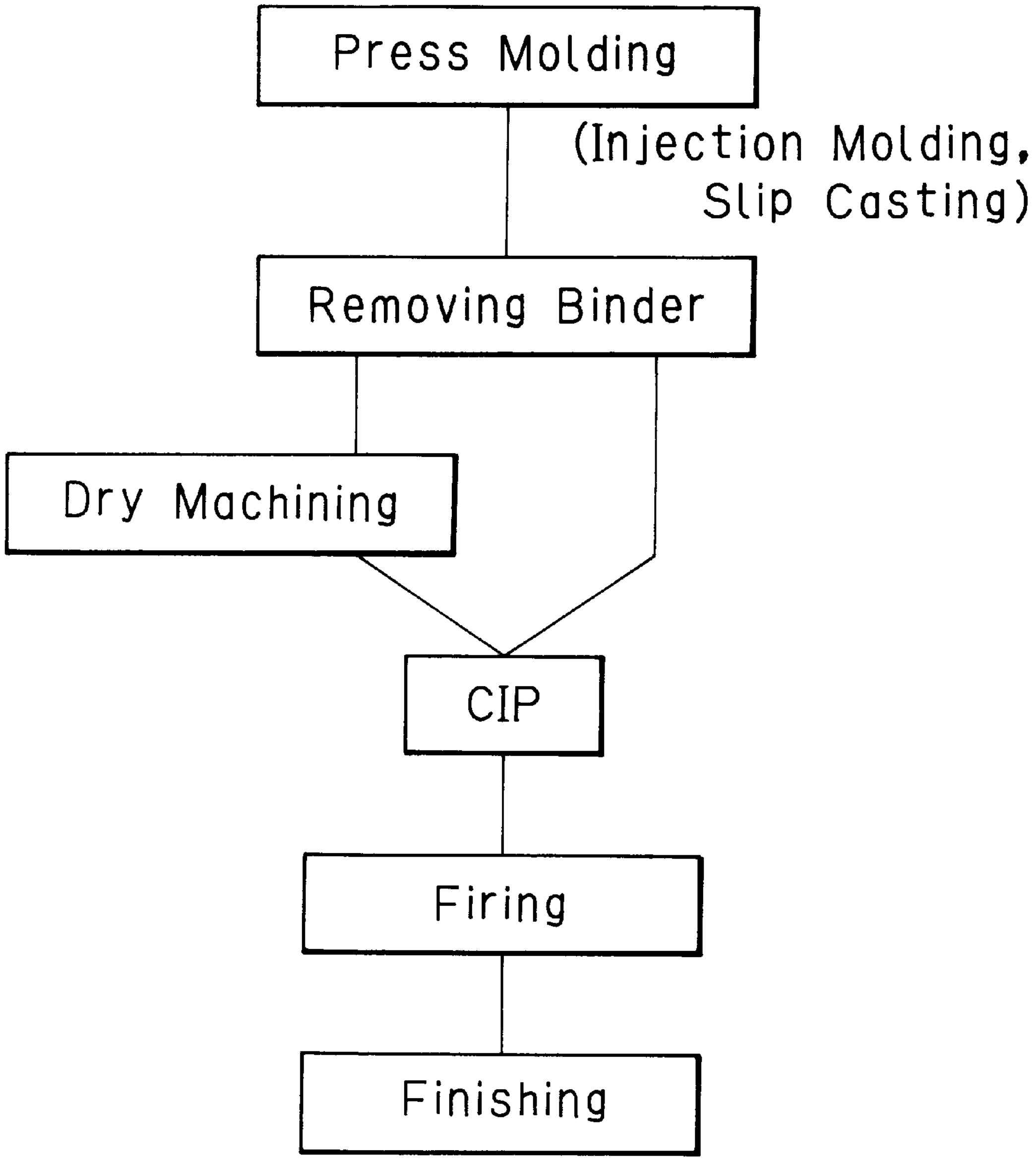
FIG. 1 shows a process flow chart for manufacturing ceramics with fine hole(s) by the present invention.

The present invention is hereinafter described with reference to the process flow chart in FIG. 1.

(1) Each of ceramic compacts is formed independently by molding which gives a shape of a compact with partial holes having diameters calculated from a speculated rate of contraction during firing, followed by removing the binder in each compact.

(2) Ceramic compacts without partial hole(s) are formed independently, followed by removing the binder. Then desired partial holes are arranged in given place(s) of each cross section by machining to obtain ceramic compacts with partial hole(s).

(3) Two of the ceramic compacts obtained by means of (1) or (2) are placed adjacent each other so that the partial holes match, and they are sealed up in a bag or a mold made of a flexible material such as rubber in order to perform cold isostatic pressing (CIP).

(4) The compacts formed independently are joined into an integrated form by cold isostatic pressing (CIP). Then, the form is fired to obtain a ceramic body having given hole(s).

The present invention is hereinafter described in more detail with reference to the examples shown in the figures. However, the present invention is by no means restricted to the examples.

EXAMPLE 1

FIG. 2–5 are explanatory views of each process showing an example of a manufacturing method of the present invention.

Figure 2:
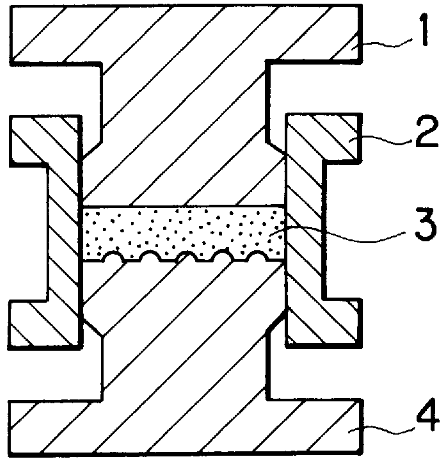
FIG. 2 is an explanatory view showing an example of a process of press molding by the present invention.
Figure 3:
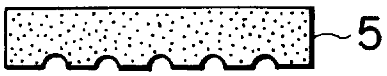
FIG. 3 is an explanatory view showing an example of a molded compact by the present invention.
Figure 4:
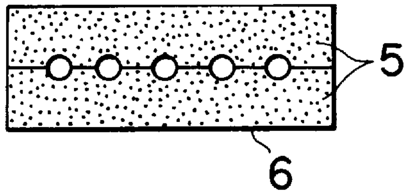
FIG. 4 is an explanatory view showing a process of placing two corresponding compacts by the present invention.
Figure 5:
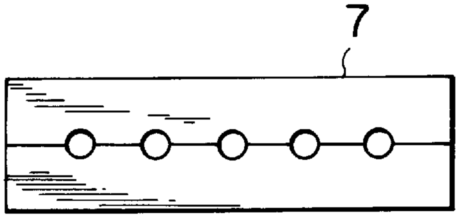
FIG. 5 shows an explanatory view showing an example of an integrated ceramic compact obtained by cold isostatic pressing (CIP) by the present invention.
Figure 6:
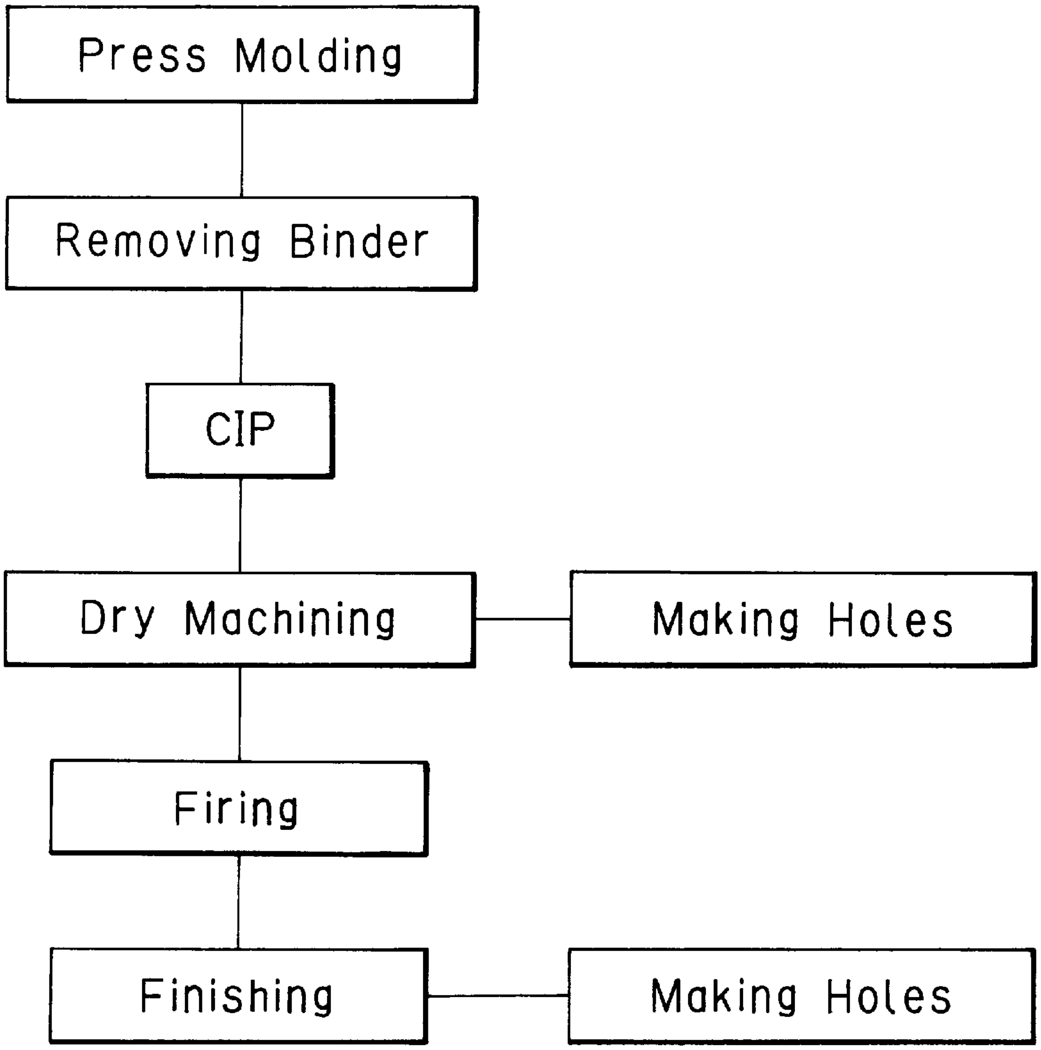
FIG. 6 shows a process flow chart for manufacturing ceramics with fine hole(s) by a conventional method.

As shown in FIG. 2, a mold consisting of an upper punch 1, a lower punch 4, and cylinder 2 was prepared. Then, a required quantity of ceramic powdery material 3 was placed in the mold and subjected to a press molding under a pressure of 200 kgf/cm$^2$ to obtain two ceramic compacts 5 having identical shapes, one of the compacts is shown in FIG. 3. Subsequently, the two compacts 5 were placed adjacent each other so as to match each of the corresponding partial holes to result in each complete hole and sealed up by covering the outer surface with a latex rubber 6. The compacts were subjected to cold isostatic pressing (CIP) under a pressure of 7000 kgf/cm$^2$ to obtain an integrated ceramic compact 7 shown in FIG. 5. The integrated ceramic compact 7 thus obtained was fired in an electric furnace at a temperature of 1700° C. for one hour to obtain a sintered ceramic body with fine holes.

EXAMPLE 2

Figure 10:
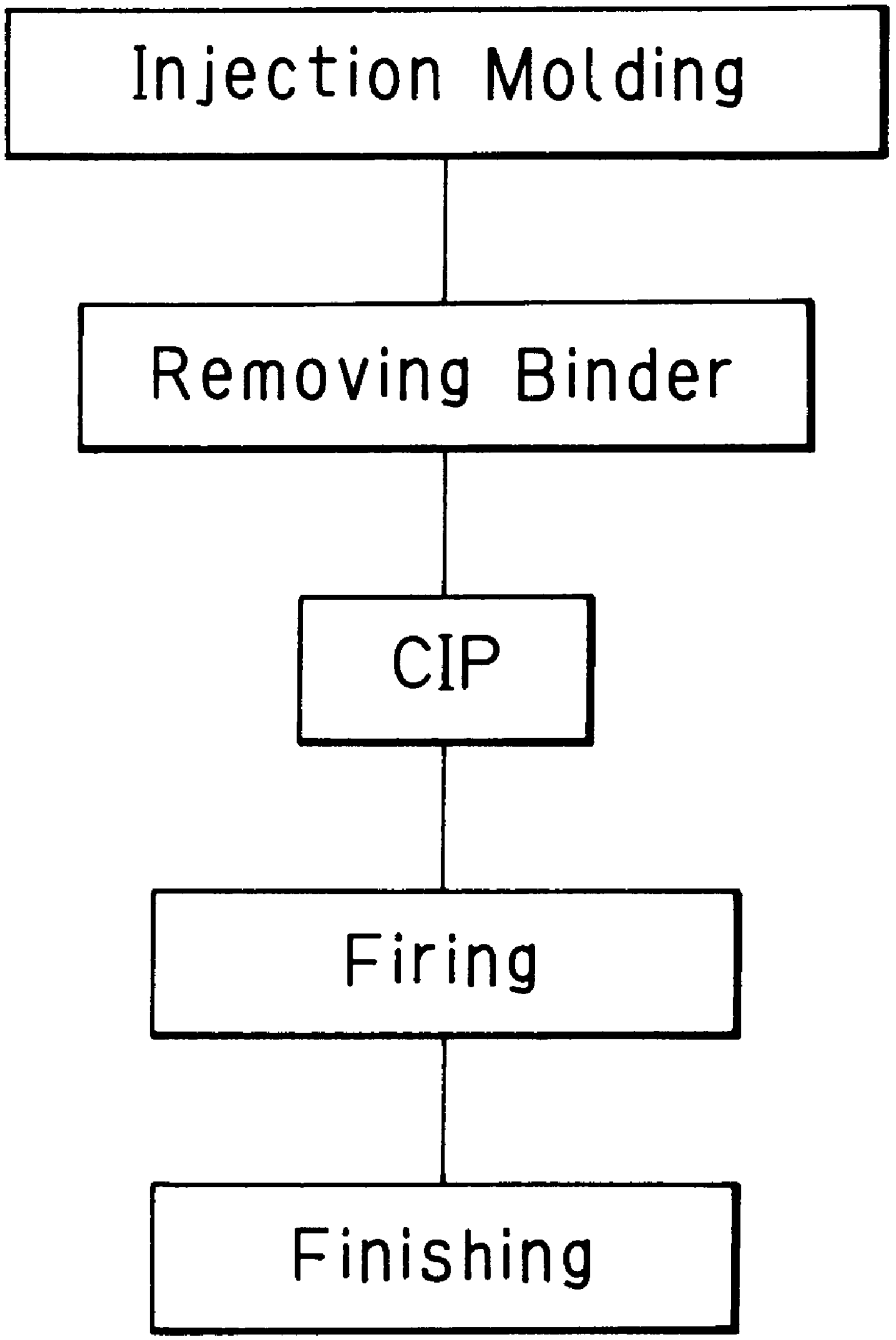
FIG. 10 shows a process flow chart of the present invention in which injection molding is employed.

FIG. 10 is a process flow chart in which injection molding is employed. It can be preferably applied to such a case that desired hole(s) are to be formed in a complex-shaped component like a blade of a gas turbine.

Figure 7:
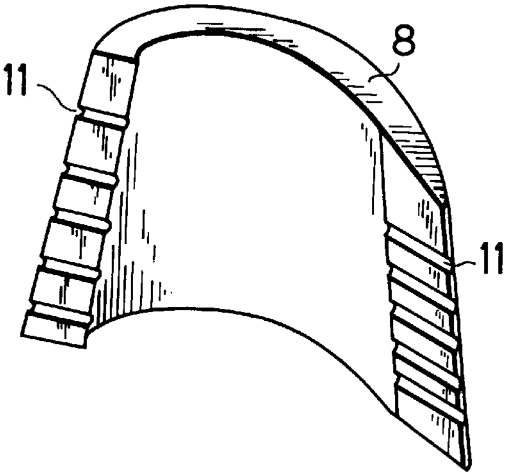
FIG. 7 is a perspective view showing an example of one of two compacts to form a blade used in a gas turbine.
Figure 8:
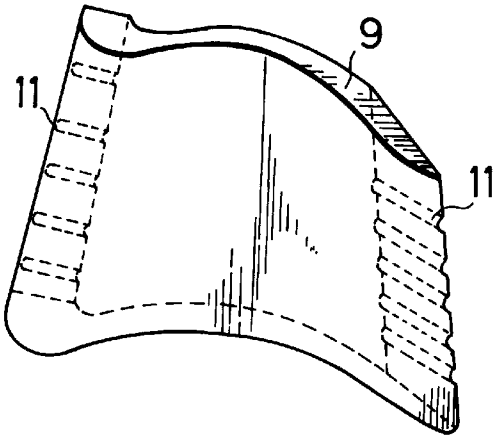
FIG. 8 is a perspective view showing an example of the other of two compacts to form a blade used in a gas turbine.
Figure 9:
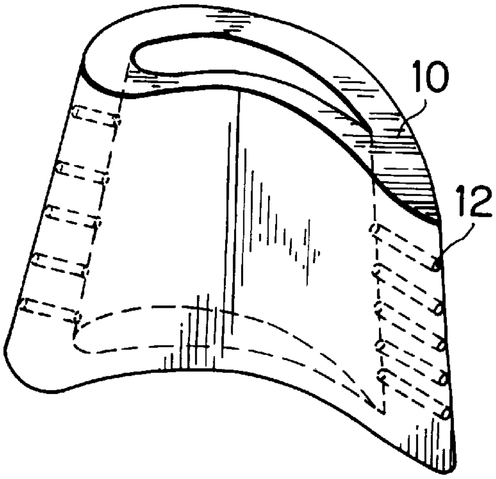
FIG. 9 shows a perspective view showing an example of a blade used in a gas turbine having holes at given places.

In order to form the desired holes 12 in the given places of the blade of a gas turbine as shown in FIG. 9. The two compacts 8 and 9 having grooves 11 at the given places as shown in FIG. 7 and FIG. 8 were manufactured independently. After the binder was removed from the compacts 8 and 9, both compacts were placed adjacent each other so as to match the corresponding partial holes to result in complete holes and sealed up by covering the outer surface with a latex rubber. Then, they were joined into an integrated form by cold isostatic pressing (CIP) under a pressure of 7000 kgf/cm$^2$ to obtain an integrated ceramic compact 7. The integrated ceramic compact 7 thus obtained was fired in an electric furnace at a temperature of 1700° C. for one hour to obtain a sintered ceramic body with holes 12 in the given places as shown in FIG. 9.

EXAMPLE 3

Figure 14:
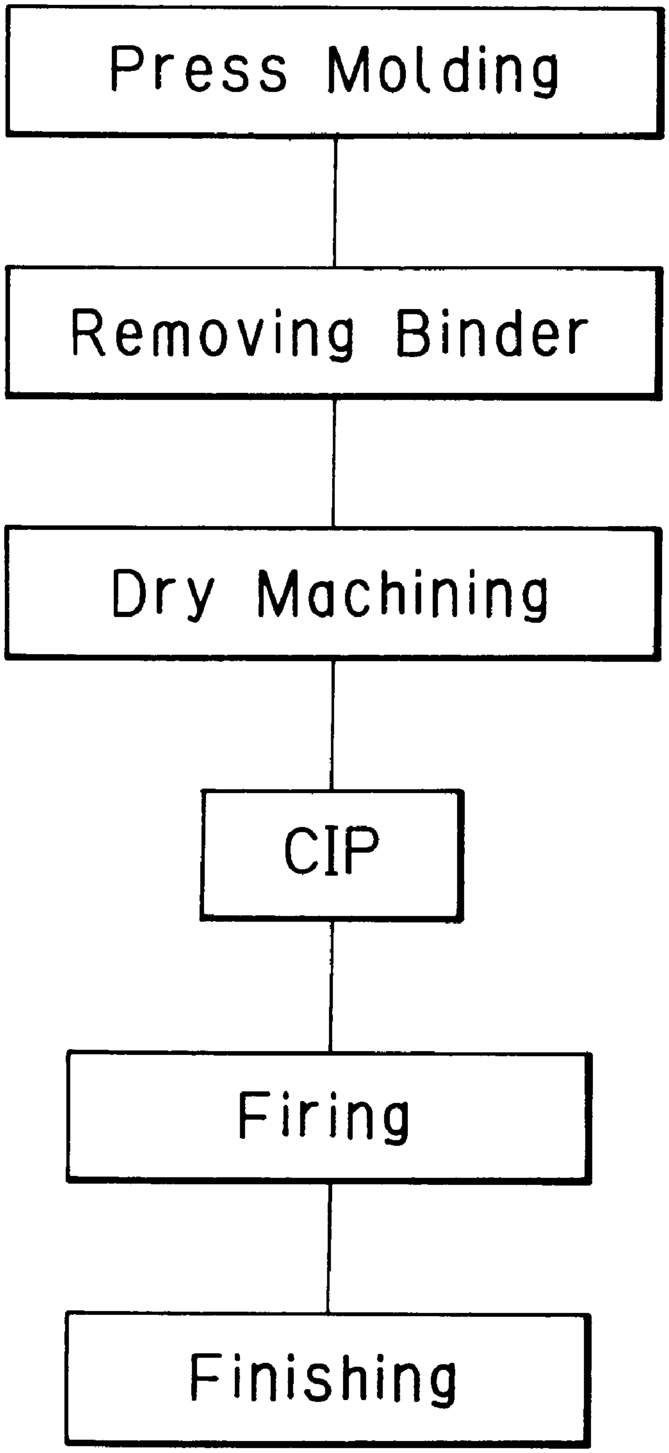
FIG. 14 shows a process flow chart of the present invention by which a ceramic body having non-straight hole(s) is obtained.

FIG. 14 is a process flow chart of the present invention in which machining is employed after press molding. This method can be preferably applied for manufacturing a ceramic sintered body having non-straight hole(s).

Figure 11:
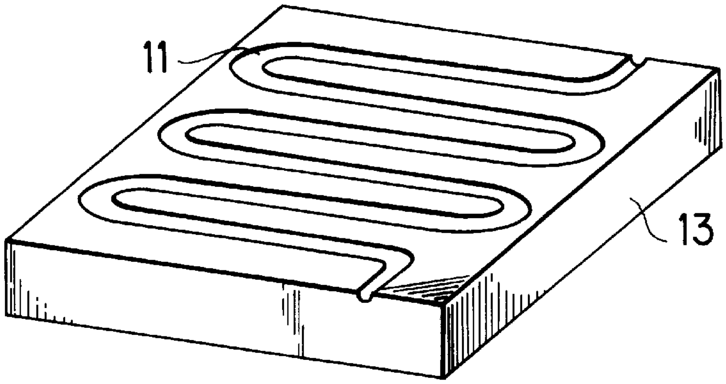
FIG. 11 is a perspective view showing an example of a ceramic compact having a non-straight groove.
Figure 12:
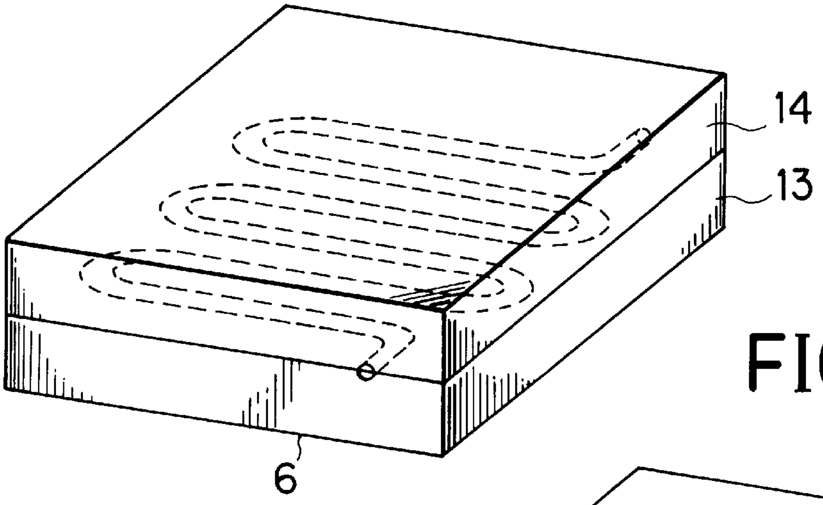
FIG. 12 is a perspective view showing a process of placing two corresponding compacts, each having a non-straight groove, by the present invention.
Figure 13:
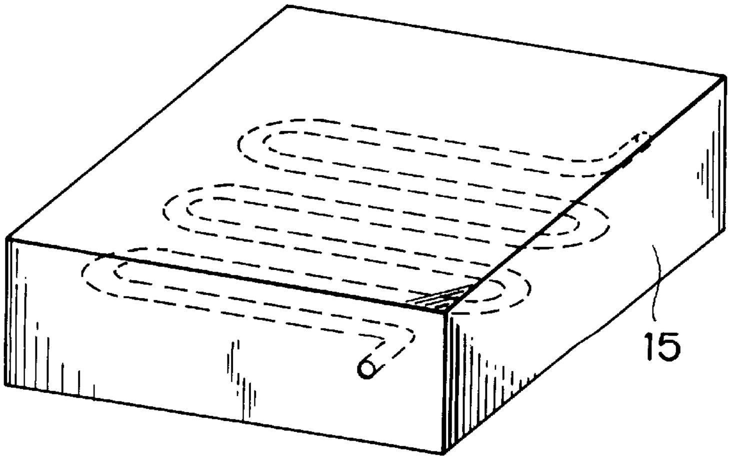
FIG. 13 is a perspective view showing a sintered ceramic body having a non-straight hole.

The binder was removed from the compact obtained by press molding. Then, machining was performed on the surface of the compact to give a ceramic compact 13 having a non-straight groove 11 as shown in FIG. 11. A ceramic compact 14 having a groove which is a mirror image of that of a ceramic compact 13 was manufactured by the same method as for the ceramic compact 13. The obtained ceramic compacts 13 and 14 were placed adjacent each other so that both grooves match with each other as shown in FIG. 12, followed by covering the outer surface with a latex rubber 6, and then joined into an integrated form by CIP under the pressure of 7000 kgf/cm$^2$. The integrated compact thus obtained was fired in an electric furnace at a temperature of 1700° C. for one hour to obtain a sintered ceramic body 15 having a non-straight hole as shown in FIG. 13.

As described above, according to the present invention, there can be obtained a sintered ceramic body with hole(s) having a diameter equal to or smaller than 0.5 mm and capable of achieving a desired depth and shape by forming at least two compacts to form an integral body, which need not perform machining after removing the binder or after firing.

Moreover, the present invention made it possible to obtain ceramics with hole(s) in a complex or curved shape, which cannot be obtained by the conventional methods.

Therefore, the present invention can be preferably applied to manufacturing ceramics with fine hole(s), which are useful for turbine blades of gas turbines, ceramic liners, nozzles, or the like.

What is claimed is:

1. A method for manufacturing a ceramic having at least one hole comprising the steps of:

forming independently at least two ceramic compacts, said ceramic compacts having their shapes corresponding to the divided parts of one integrated body having at least one hole along which the integrated body is divided;

joining said ceramic compacts into an integrated form having at least one hole by cold isostatic pressing; and firing the integrated compact.

2. A method for manufacturing a ceramic with at least one hole therethrough comprising the steps of:

forming independently at least two ceramic compacts, said ceramic compacts having their shapes corresponding to the divided parts of one integrated body;

grooving said ceramic compacts to make at least one groove for forming at least one hole therethrough when joining on the surface of each of said ceramic compacts by machining;

joining said ceramic compacts into an integrated form having at least one hole therethrough by cold isostatic pressing; and firing the integrated compact.

3. A method for manufacturing a ceramic with at least one hole therethrough according to claim 1 or 2, wherein said compacts are formed by press molding.

4. A method for manufacturing a ceramic with at least one hole therethrough according to claim 1 or 2, wherein said compacts are formed by injection molding.

* * * * *